(12) United States Patent
Narasimhan et al.

(10) Patent No.: US 11,588,924 B2
(45) Date of Patent: Feb. 21, 2023

(54) STORAGE INTERFACE COMMAND PACKETS OVER FIBRE CHANNEL WITH TRANSPORT AND NETWORK HEADERS AS PAYLOADS

(71) Applicant: HEWLETT PACKARD ENTERPRISE DEVELOPMENT LP, Houston, TX (US)

(72) Inventors: Sriram Narasimhan, Cupertino, CA (US); Alex Veprinsky, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/083,845

(22) Filed: Oct. 29, 2020

(65) Prior Publication Data

US 2022/0141320 A1    May 5, 2022

(51) Int. Cl.
| | |
|---|---|
| *H04L 29/06* | (2006.01) |
| *H04L 69/16* | (2022.01) |
| *H04L 49/356* | (2022.01) |
| *H04L 69/22* | (2022.01) |
| *H04L 69/324* | (2022.01) |
| *H04L 67/1097* | (2022.01) |

(52) U.S. Cl.
CPC .......... *H04L 69/161* (2013.01); *H04L 49/357* (2013.01); *H04L 67/1097* (2013.01); *H04L 69/22* (2013.01); *H04L 69/324* (2013.01)

(58) Field of Classification Search
CPC .......... G06F 3/00; G06F 3/061; G06F 3/0635; G06F 3/067; G06F 16/21; H04L 67/1097; H04L 69/14; H04L 45/22

USPC .......................................................... 370/392
See application file for complete search history.

(56) References Cited

U.S. PATENT DOCUMENTS

| | | | |
|---|---|---|---|
| 8,073,674 B2 | 12/2011 | Gehr et al. | |
| 9,591,099 B1* | 3/2017 | Pittman .................. | G06F 3/0611 |
| 9,647,905 B1* | 5/2017 | Pittman .................. | H04L 67/00 |
| 9,712,427 B1* | 7/2017 | Pittman .................. | G06F 21/606 |
| 10,693,832 B1* | 6/2020 | Wenig .................. | H04L 12/4633 |
| 2016/0011804 A1* | 1/2016 | Law ..................... | H04L 67/1097 |
| | | | 711/114 |
| 2016/0217098 A1* | 7/2016 | Chiu ..................... | G06F 3/0632 |

(Continued)

FOREIGN PATENT DOCUMENTS

WO    WO-2016043953    3/2016

OTHER PUBLICATIONS

Herrin, Glenn, Linux IP Networking, TR 00-04, May 31, 2000 (90 pages).

(Continued)

*Primary Examiner* — Robert J Lopata
(74) *Attorney, Agent, or Firm* — Trop, Pruner & Hu, P.C.

(57) ABSTRACT

In some examples, a system includes a Fibre Channel (FC) interface to communicate over an FC network, and a network stack including a network layer and a transport layer. Machine-readable instructions are executable to produce a command packet including a payload including data for transmission to another system, the payload further including headers for the network layer and the transport layer, where the command packet is according to a storage interface protocol. The FC interface is to communicate the command packet over the FC network.

20 Claims, 6 Drawing Sheets

(56) References Cited

U.S. PATENT DOCUMENTS

| | | | | |
|---|---|---|---|---|
| 2016/0259561 | A1* | 9/2016 | Hong | G06F 3/0632 |
| 2017/0052916 | A1* | 2/2017 | Kollu | G06F 13/4022 |
| 2017/0064007 | A1* | 3/2017 | Brown | H04L 67/02 |
| 2017/0251083 | A1* | 8/2017 | Burbridge | G06F 3/067 |
| 2017/0329714 | A1* | 11/2017 | Jin | G06F 3/067 |
| 2019/0222522 | A1* | 7/2019 | Shih | H04L 47/6255 |
| 2020/0089884 | A1* | 3/2020 | Winokur | G06F 21/566 |
| 2021/0073045 | A1* | 3/2021 | Diaz-Cuellar | G06F 9/5077 |
| 2021/0103387 | A1* | 4/2021 | Vanninen | G06F 3/0659 |
| 2021/0149799 | A1* | 5/2021 | Yu | G06F 12/0246 |
| 2021/0281643 | A1* | 9/2021 | Szczepanik | H04L 47/115 |

OTHER PUBLICATIONS

Hewlett Packard Enterprise, Smartoptics, Reducing the long distance replication gap, HPE 3PAR Remote Copy and Smartoptics Open Line C/DWDM networking, Jun. 2017 (8 pages).

Hornig, C.; "A Standard for the Transmission of IP Datagrams over Ethernet Networks"; Apr. 1984; Network Working Group, Request for Comments: 894; 3 pages; <https://tools.ietf.org/pdf/rfc894.pdf>.

Linux, Networking downloaded Oct. 8, 2020 (24 pages).

Marsden, G.; "Introducing SPDK for Oracle Linux"; Feb. 26, 2019; 4 pages.

Packagecloud; "Monitoring and Tuning the Linux Networking Stack: Sending Data"; Feb. 6, 2017; 143 pages.

Wikipedia, Fibre Channel last edited Jun. 23, 2020 (14 pages).

Wikipedia, SCSI CDB last edited Jul. 4, 2020 (3 pages).

Wikipedia, SCSI last edited Sep. 26, 2020 (9 pages).

Wikipedia, TUN/TAP last edited Aug. 18, 2020 (3 pages).

Tony Bourke, "Ethernet over Fibre Channel," available online at <<https://datacenterovenords.com/2015/04/01/ethernet-over-ribre-channel/>, Apr. 1, 2015, 7 pages.

DeSanti et al., "Transmission of IPv6, IPv4, and Address Resolution Protocol (ARP) Packets over Fibre Channel," Jan. 2006, Network Working Group, Request for Comments: 4338, archived version accessible Jun. 30, 2020, <https://web.archive.org/web/20200630095744/https://www.rfc-editor.org/rfc/pdfrfc/rfc4338.txt.pdf>.

NetApp, Inc., "Data protection using SnapMirror," Apr. 2015, <https://library.netapp.com/ecmdocs/ECMP1635994/html/GUID-BA1081BE-828B-4C6E-8A82-FB0F87AC514E.html>.

NetApp, Inc., "SnapMirror over Fibre Channel," Apr. 2015, <https://library.netapp.com/ecmdocs/ECMP1635994/html/GUID-A8CF2A01-F029-493F-A9ED-781AE5510D68.html>.

NetApp, Inc., "SnapMirror over Fibre Channel topology," Apr. 2015, <https://library.netapp.com/ecmdocs/ECMP1635994/html/GUID-OF3AF086-5912-43D9-B4CE-5116DBD129C4.html>.

\* cited by examiner

STORAGE INTERFACE COMMAND PACKETS OVER FIBRE CHANNEL WITH TRANSPORT AND NETWORK HEADERS AS PAYLOADS

BACKGROUND

A storage area network (SAN) can be used to connect computing devices (e.g., server computers, client computers, etc.) to data storage systems. The computing devices can issue requests to the data storage systems to access (read or write) data of the data storage systems. Additionally, other types of data services can be provided over a SAN, such as a storage replication service (in which data is copied from a first data storage system to a second data storage system or multiple second data storage systems, a data backup service (in which data is backed up to a data storage system or multiple data storage systems), so forth.

BRIEF DESCRIPTION OF THE DRAWINGS

Some implementations of the present disclosure are described with respect to the following figures.

Figure 1:
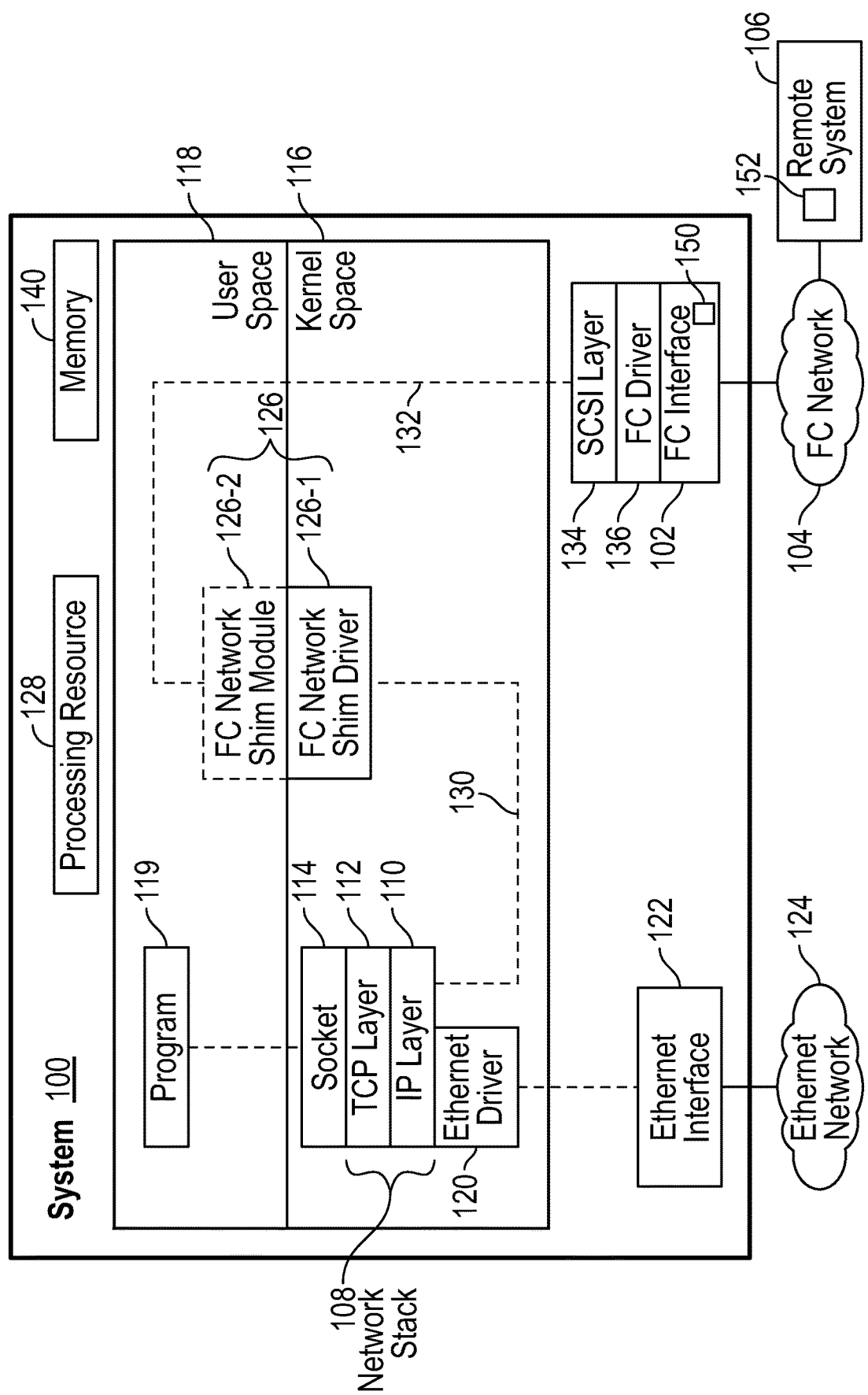
FIG. 1 is a block diagram of an arrangement including a system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Data transfer protocols can be used for transferring data over a SAN. A high-speed data transfer protocol that can be used includes a Fibre Channel (FC) protocol, which provides for relatively high speed (up 120 gigabits (Gb) per second, for example) transfer of data across the SAN. Data services, such as a storage replication service, that employ the FC protocol can be performed at relatively high speeds.

FC includes multiple layers, including an FC-0 layer (the physical layer), an FC-1 layer (a Transmission Protocol layer for coding signals to carry data), an FC-2 layer (a Signaling Protocol layer), an FC-3 layer (a common services layer to implement various services such as encryption or redundancy algorithms), and an FC-4 layer (a protocol-mapping layer in which upper level protocols are encapsulated into Information Units for delivery to the FC-2 layer).

Upper level protocols can include a protocol for a transport layer (Layer 4 of the Open Systems Interconnection (OSI) model) and a network layer (Layer 3 of the OSI model). In some example systems, data services over FC employs proprietary upper level protocols, such as proprietary Layer 4 and Layer 3 protocols. Developing proprietary upper level protocols for supporting data services over FC may be a time-consuming and costly process.

Examples of data services that can be provided over a SAN include any or some combination of the following: data access operations to read and write data in a data storage system, a storage replication service that copies data from a first data storage system to a second data storage system or multiple second data storage systems, a data backup service to back up data to a data storage system or multiple data storage systems, a data deduplication service to remove or reduce duplicates of data in a data storage system, or any other service in which data communication occurs over the SAN.

In accordance with some implementations of the present disclosure, standardized transport layer and network layer protocols can be employed to support data services over FC. A "standardized" protocol can refer to a protocol that is set forth in standards, specifications, or other information by standards bodies or other entities. More generally, a "standardized" protocol can refer to a protocol adopted by different enterprises (e.g., different companies, organizations, etc.) for use in communications over networks. A network can refer to a wired network, a wireless network, or a combination of wired and wireless networks. Examples of networks include a SAN, a local area network (LAN), a wide area network (WAN), a public network (e.g., the Internet), and so forth.

An example of a transport layer protocol is the Transmission Control Protocol (TCP), which is a protocol used to provide reliable, ordered, and error-checked transport of data between endpoints over a network. An example of a standardized network layer protocol is an Internet Protocol (IP), which governs communications of packets across the network. A packet according to IP is referred to as an IP packet, which includes an IP header and a payload. The payload in an IP packet is used to carry data for communication over a network, and the IP header contains protocol information for IP communications, including IP addresses (a source IP address to identify a sender of the packet, and a destination IP address to identify a receiver of the packet), and other control information. "IP" can refer to IPv4 (version 4 of IP), IPv6 (version 6 of IP), or any other IP version.

TCP is a Layer 4 protocol, while IP is a Layer 3 protocol. TCP can provide for reliable and ordered transport of data over an IP network, which is a network that performs communications using IP packets. In network communications that employ both TCP and IP, a packet can include a TCP header, an IP header, and a payload. Such a packet can also be referred to as a "TCP/IP packet." The TCP header contains control information defined by TCP.

More generally, a transport layer protocol manages transport of data between endpoints, while a network layer protocol is used to define packets used for carrying data over a network.

Another layer of the OSI model is Layer 2, also referred as a data link layer. An example of a data link layer is an Ethernet driver, which supports Ethernet communications, as defined by the Institute of Electrical and Electronics Engineers (IEEE) 802 standards. A data link layer manages the transfer of data to the physical layer (which is Layer 1) of a system.

As used here, a "system" can refer to a computer (e.g., a desktop computer, a notebook computer, a tablet computer, a server computer, etc.), a handheld device (e.g., a smartphone, a game appliance, etc.), an Internet-of-Things (IoT) device, a vehicle (or a controller in a vehicle), a data storage system, a communication node, and so forth.

In accordance with some implementations of the present disclosure, as shown in FIG. 1, a system 100 includes an FC interface 102 (e.g., an FC card or controller) to communicate over an FC network 104 with a remote system 106 (or multiple remote systems). The FC interface 102 can also be referred to as an FC host bus adapter (HBA). An FC network is a network over which data transfer is according to the FC protocol. The FC interface 102 includes a physical layer (including a transceiver) that transmits and receives signals according to the FC protocol over the FC network 104.

The system 100 further includes a network stack 108 that includes an IP layer 110 (an example of a network layer) and a TCP layer 112 (an example of a transport layer). The network stack 108 that includes the IP layer 110 and the TCP layer 112 is referred to as a TCP/IP stack. More generally, a "network stack" refers to a collection of layers that provide for communications according to respective different protocols, such as at different levels of the OSI model. The layers of the network stack 108 can be implemented using machine-readable instructions and/or a hardware processing circuit (e.g., a processor, a microcontroller, a programmable gate array, a programmable integrated circuit, and so forth).

Although FIG. 1 shows the network stack 108 with two layers, in other examples, a network stack can include more than two layers.

The system 100 includes a kernel space 116 and a user space 118. A kernel is the core of an operating system (OS) of the system 100. The kernel operates in a privileged space, referred to as the kernel space 116. The user space 118 is considered a non-privileged space.

Various programs (e.g., application programs or other types of programs), including a program 119, execute in the user space 118. The program 119 can provide a data service, such as any of the data services noted further above. The network stack 108 executes in the kernel space 116.

A program executing in the user space 118 does not have certain privileges that are available to code, such as the network stack 108, executing in the kernel space 116. Such privileges can include access of certain system resources (e.g., a specific portion of a memory 140, specific code, specific hardware devices, etc.).

The system 100 further includes a socket layer 114. The socket layer 114 provides a communication channel between the network stack 108 in the kernel space 116 and the program 109 in the user space 118.

In the example of FIG. 1, the socket layer 114 is also depicted as being part of the kernel space 116. In other examples, the socket layer 114 can be part of the user space 118.

In some examples, an Ethernet driver 120 (an example of a data link layer) is also part of the kernel space 116. The Ethernet driver 120 manages communication through an Ethernet interface 122 of the system 100. The Ethernet interface 122 can include an Ethernet card or controller, and includes a physical layer (a transceiver) that transmits and receives signals over an Ethernet network 124.

An Ethernet network 124 is a network that communicates data according to the Ethernet protocol. According to the Ethernet protocol, data is communicated in data frames, where each data frame includes an Ethernet header and a payload. The Ethernet header includes a source Medium Access Control (MAC) address and a destination MAC address, where the source MAC address identifies a sender, and the destination MAC address identifies a destination. The Ethernet header also includes other control information. The payload of an Ethernet data frame contains data to be communicated, such as a TCP/IP packet.

Collectively, in examples where the kernel of the system 100 is a Linux kernel, the socket layer 114, the TCP layer 112, the IP layer 110, and the Ethernet driver 120 are part of the Linux Ethernet stack for communications using Ethernet.

In other examples, the kernel of the system 100 can be part of a different type of an OS.

Although the system 100 includes the Ethernet driver 120 and the Ethernet interface 122 in some examples, the Ethernet driver 120 and the Ethernet interface 122 may be omitted in other examples.

In accordance with some implementations of the present disclosure, the system 100 further includes an FC network shim code (either a kernel space FC network shim driver 126-1 or a user space FC network shim module 126-2), which presents an FC-based connection as a virtual Ethernet link to the network stack 108. An "FC-based connection" refers to a connection over the FC network 104 to allow communications between endpoints. More specifically, the FC-based connection is established between an FC port in an endpoint (such as an FC port 150 of the FC interface 102 in the system 100, and an FC port 152 in the remote system 106) and an FC port in an FC switch in the FC network 104. An FC switch refers to a network device that forwards an FC frame from a sending endpoint (e.g., one of the systems 100 and 106) along the FC network 104 for receipt by a receiving endpoint (e.g., another one of the systems 100 and 106).

The FC-based connection presented as a virtual Ethernet link to the network stack 108 means that the kernel (and more specifically the network stack 108) perceives the layers (including 134, 136, and 102) of the system 100 that allow for communication over the FC network 104 as being layers for Ethernet communications.

According to FC, the FC ports 150 and 152 (that are part of endpoints) are referred to as N_Ports, or node ports. Although just one FC port 150 is shown in the system 100, in other examples, the FC interface 102 may provide multiple FC ports 150. Similarly, the remote system 106 may include multiple FC ports 152.

The FC network shim code (referred to as "FC network shim code 126" which can either be the kernel space FC network shim driver 126-1 or the user space FC network shim module 126-2) refers to a program code that is to redirect outgoing data from the network stack 108 to a path that leads to the FC interface 102, and to process incoming data from the FC interface 102 and provide the processed incoming data to the network stack 108. The outgoing data may be data to be transmitted by the program 119, and the incoming data may be data destined to the program 119.

For example, the FC network shim code 126 may redirect outgoing Ethernet data to a path leading to the FC interface 102. Without the FC network shim code 126, the outgoing Ethernet data would be communicated through the Ethernet driver 120 and the Ethernet interface 122 to the Ethernet network 124.

To allow the FC network shim code 126 to redirect outgoing Ethernet data to a path leading to the FC interface 102, the FC network shim code 126 registers a virtual Ethernet device with the network stack 108. The virtual Ethernet device is a simulated Ethernet device to allow for data transfer between the network stack 108 and the FC network shim code 126, so that Ethernet data can be communicated over the FC network 104 without using any actual Ethernet driver (e.g., 120). Registering the virtual Ethernet device with the network stack 108 includes the FC network shim code 126 providing an indication (in the form of information, a message, a command, a file, etc.) to the network stack 108, where the indication is to cause the network stack 108 to transfer Ethernet data to the FC network shim code 126 instead of the Ethernet driver 120.

In some examples, the FC network shim code 126 is implemented in the kernel space 116 as the FC network shim driver 126-1. The FC network shim driver 126-1 is a kernel Ethernet device driver. In other examples, the FC network shim code 126 is implemented in the user space 118 (represented in dashed profile in FIG. 1) as the FC network shim module 126-2.

The FC network shim code 126 is implemented as machine-readable instructions executable by a processing resource 128 of the system 100. The processing resource 128 can include any or a combination of a microprocessor, a core of a multi-core microprocessor, a microcontroller, a programmable integrated circuit, a programmable gate array, or another hardware processing circuit.

In examples where the FC network shim code 126 has registered a virtual Ethernet device with the network stack 108, outgoing data of the program 119 (or another program in the user space 118) is passed through the socket layer 114 and the network stack 108 to the FC network shim code 126, as indicated by an inter-process path 130. An "inter-process path" between different modules/layers of the system 100 can refer to any inter-process link, which allows different processes or threads of the system 100 to communicate with one another.

The network stack passes the outgoing data (of the program 119) as well as headers for the TCP layer 112 and IP layer 110 (a TCP header and an IP header) over the inter-process path 130 to the FC network shim code 126. The FC network shim code 126 passes the outgoing data, the IP header, the TCP header, and an Ethernet header over an inter-process path 132 to a layer 134. Note that the Ethernet header is either generated by the FC network shim code 126 in examples where the FC network shim code 126 is implemented as the kernel space FC network shim driver 126-1, or generated by another module (discussed later) in examples where the FC network shim code 126 is implemented as the user space FC network shim module 126-2.

In some examples, the layer 134 is a Small Computer System Interface (SCSI) layer. The SCSI protocol is an example of a storage interface protocol that manages communication of data according to the SCSI protocol. In other examples, other storage interface protocols can be employed. A "storage interface protocol" refers to a protocol that manages the control of access of storage devices.

SCSI provides for the communication of a command in a SCSI command information unit, and the communication of data in a SCSI data information unit. The SCSI command information unit is also referred to as a command descriptor block (CDB), which includes an operation code (opcode) specifying a command that is communicated in the CDB, along with other parameters relating to the command.

The SCSI layer 134 wraps the outgoing data, the IP header, the TCP header, and the Ethernet header from the FC network shim code 126 in a payload of a command packet according to a storage interface protocol, such as a SCSI CDB.

The system 100 further includes an FC driver 136 that manages communication of data with the FC interface 102. In some examples, the SCSI layer 134 and the FC driver 136 are part of the kernel space 116. In other examples, the SCSI layer 134 and the FC driver 136 are part of the user space 118.

The command packet including the payload that has an Ethernet header, a TCP header, an IP header, and outgoing data is communicated by the FC driver 136 through the FC interface 102 to the FC network 104.

In some examples, the command packet may be split by the FC interface 102 into multiple FC frames of a specified size (or sizes), for transmission over the FC network 104, for receipt by a receiving endpoint (e.g., the remote system 106). In other examples, the FC interface 102 does not split the command packet into multiple FC frames, but instead the command packet is carried in a single FC frame.

Incoming data (e.g., from the remote system 106) can be received by the FC interface 102 in the form of an FC frame (or FC frames). The incoming FC frame(s) can include a command packet (e.g., a SCSI CDB) including a payload that contains the incoming data, an Ethernet header, an IP header, and a TCP header. The FC driver 136 passes the received SCSI CDB to the SCSI layer 134, which extracts the payload (including the incoming data, the Ethernet header, the IP header, and the TCP header). The extracted payload is sent over the inter-process path 132 to the FC network shim code 126, which then sends the incoming data, the IP header, and the TCP header over the inter-process path 130 to the network stack 108. The network stack 108 in turn sends the incoming data through the socket layer 114 to the program 119.

Figure 2:
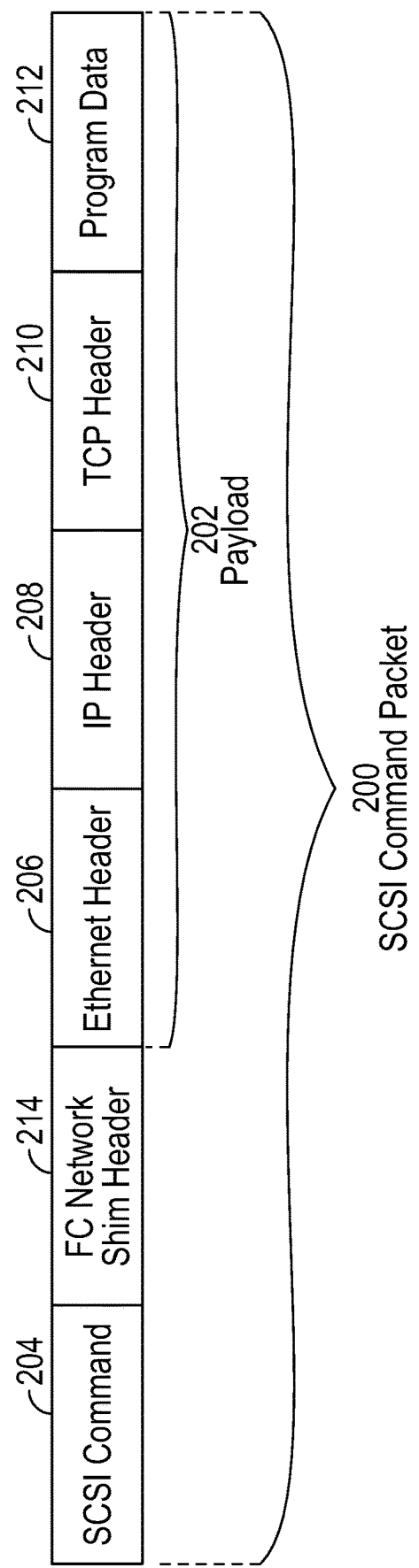
FIG. 2 is a block diagram of a command packet according to a storage interface protocol, according to some examples.

FIG. 2 shows an example of a SCSI command packet 200, also referred to as a SCSI CDB. The SCSI command packet 200 contains a payload 202 and SCSI command control information 204.

The payload 202 of the SCSI command packet 200 contains an Ethernet header 206, an IP header 208, a TCP header 210, and program data 212, such as data to be transmitted by or received by the program 119.

In some examples, an FC network shim header 214 can also be added to the SCSI command packet 200, such as to align the payload 202 to a target boundary, such as a boundary specified by hardware (e.g., of an FC interface) of a sender system or destination system. Also, the FC network shim header 214 can be used to allow the IP header in the SCSI command packet 200 to be 4-byte or 8-byte aligned. An IP header is 4-byte aligned if the IP header has a size that is a multiple of 4 bytes, and an IP header is 8-byte aligned if the IP header has a size that is a multiple of 8 bytes. The information added to the FC network shim header 214 allows the payload 202 and/or IP header to be aligned to a target boundary. In addition, the FC network shim header 214 can include additional information to be communicated between an FC network shim code in a sender system and an FC network shim code in a destination system. The FC network shim header 214 can be added by the FC network shim code of the sender system, and removed by the FC network shim code of the destination system.

In other examples, the FC network shim header 214 is omitted.

The SCSI command control information 204 can include an operation code and command-specific parameters. The operation code can specify the SCSI operation to be performed.

In some examples, a unique MAC address and a unique IP address are created for each FC port (e.g., 150) that is to be used to carry program data (of the program 119, for example) in a command packet (e.g., SCSI CDB) as discussed above. For example, the creation of the unique MAC address and the IP address may be performed by the FC network shim code 126 as part of or prior to the FC network shim code 126 registering a virtual Ethernet device with the network stack 108, as discussed further above. Alternatively, the unique MAC address and the unique IP address are created by a different entity in the system 100, such as by a kernel, the program 119, a user, or another entity. In the latter examples, the unique MAC address and the unique IP address can be provided to the FC network shim code 126 for use by the FC network shim code 126.

In some examples, the unique MAC address can be derived from information associated with the FC port 150. For example, the unique MAC address can be produced by a function that receives as input information associated with the FC port 150, and produces as output the unique MAC address (e.g., a 48-bit MAC address, or an address of a different length). The information associated with the FC port 150 can include any or some combination of a world wide name (WWN) of the FC port 150, a port configuration of the FC port 150, a serial number of the system 100, and so forth. The function that produces the unique MAC address can concatenate portions of any of the foregoing pieces of information to produce the unique MAC address, or can apply any other algorithm (e.g., shifting of bits, hashing, etc.) on the foregoing pieces of information.

In some examples, the unique IP address can be in the form of an IPv6 link local IP address having the following format:

| Prefix | Intermediate Value | Interface ID |
|---|---|---|
| 1111111110 | 0 | Interface ID value |

In the IPv6 link local address, the prefix is set to a specified value, the intermediate value is all binary 0s (of a certain length), and the interface ID value is set to a value based on information associated with the FC port 150. For example, the interface ID value can be set equal to the WWN of the FC port 150, or set to a value derived from the WWN of the FC port 150, or can be set equal to any other value based on the information associated with the FC port 150. In other examples, the prefix and the intermediate value can have other values.

Although specific examples are provided regarding how a unique MAC address and a unique IP address are created, it is noted that a unique MAC address and a unique IP address can created in a different manner for use in communicating Ethernet data over the FC network 104.

Figure 3:
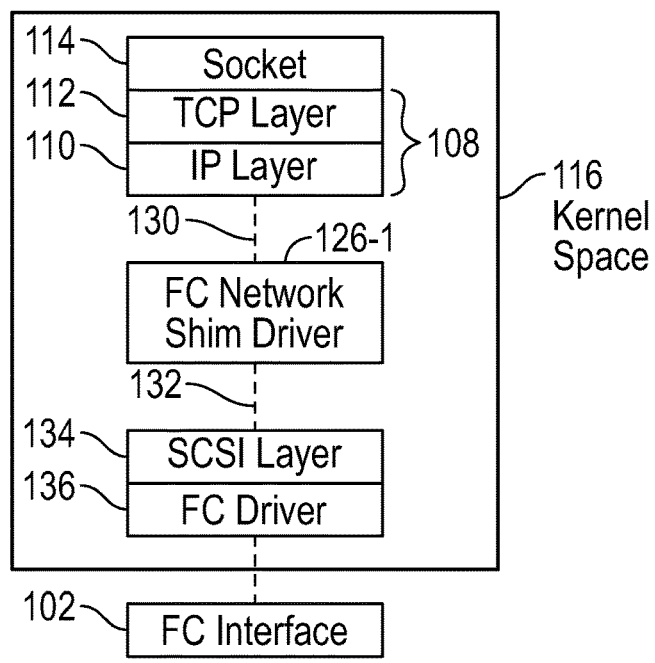
FIG. 3 is a block diagram of a portion of a system in which a Fibre Channel (FC) network shim module is implemented in a kernel space, according to some examples.

FIG. 3 shows an example in which the FC network shim code 126 of FIG. 1 is implemented as the FC network shim driver 126-1 in the kernel space 116. The FC network shim driver 126-1 uses the unique MAC address and the unique IP address discussed above. The FC network shim driver 126-1 inserts the unique MAC address as a source MAC address in an Ethernet header, and inserts the unique IP address as a source IP address in an IP header, where the Ethernet header and the IP header are to be included along with a TCP header and outgoing data as part of a payload of a SCSI CDB to be transmitted by the system 100.

For an incoming SCSI CDB, the unique MAC address used by the FC network shim driver 126-1 is included as a destination MAC address in an Ethernet header, and the unique IP address used by the FC network shim driver 126-1 is included as a destination IP address in an IP header.

In the example of FIG. 3, the SCSI layer 134 and the FC driver 136 are part of the kernel space 116.

Figure 4A:
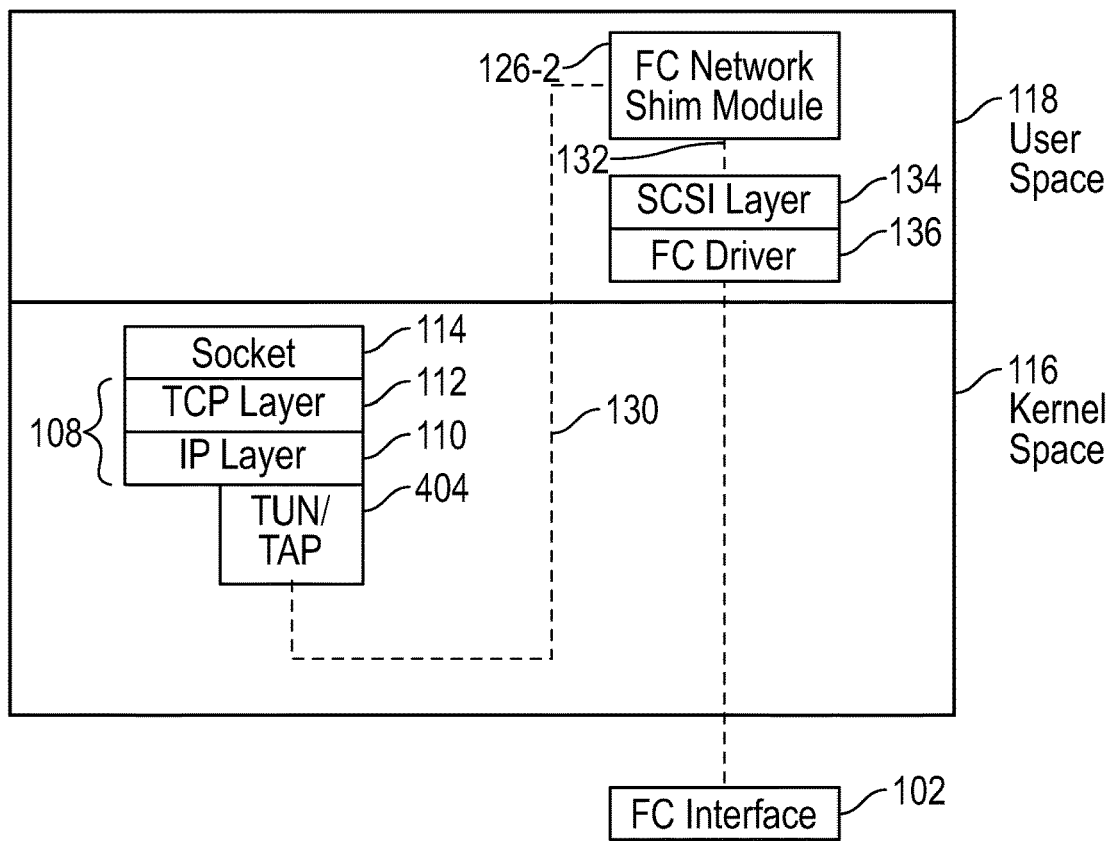
FIGS. 4A and 4B are each a block diagram of a portion of a system in which an FC network shim module is implemented in a user space, according to further examples.

FIG. 4A shows another example in which the FC network shim code 126 of FIG. 1 is implemented as the FC network shim module 126-2 in the user space 118.

The user space FC network shim module 126-2 registers a kernel virtual network devices (referred to collectively as a TUN/TAP device 404) with the network stack 108. TUN is short for "TUNnel" and simulates a network layer device. TUN operates in layer 3 and carries IP packets, for example. TAP is short for "network TAP" and simulates a data link layer device. TAP operates in layer 2 and carries Ethernet frames. A TUN/TAP driver for the TUN/TAP device 404 may be part of an OS kernel, such as the Linux kernel or a kernel of another OS.

The user space FC network shim module 126-2 is able to read from and write to the TUN/TAP device 404. In response to a read by the user space FC network shim module 126-2 of the TUN/TAP device 404, the TUN/TAP driver sends data from the network stack 108 to the user space FC network shim module 126-2. In response to a write by the user space FC network shim module 126-2 of the TUN/TAP device 404, the TUN/TAP driver receives data from the user space FC network shim module 126-2 and forwards this data to the network stack 108.

The TUN driver uses the unique IP address created as discussed above, and the TAP driver uses the unique MAC address created as discussed above. More specifically, for outgoing data, the TUN driver provides an IP header (including the unique IP address), a TCP header, and data to the user space FC network shim module 126-2. The TAP driver provides an Ethernet header (including the unique MAC address), an IP header (including the unique IP address), the TCP header, and the data to the user space FC network shim module 126-2. The user space FC network shim module 126-2 receives the Ethernet header, the IP header, the TCP header, and the data, and provides the received information to the SCSI layer 134 for inclusion in the payload of a SCSI CDB.

In the example of FIG. 4A, the SCSI layer 134 and the FC driver 136 are part of the user space 118.

Figure 4B:
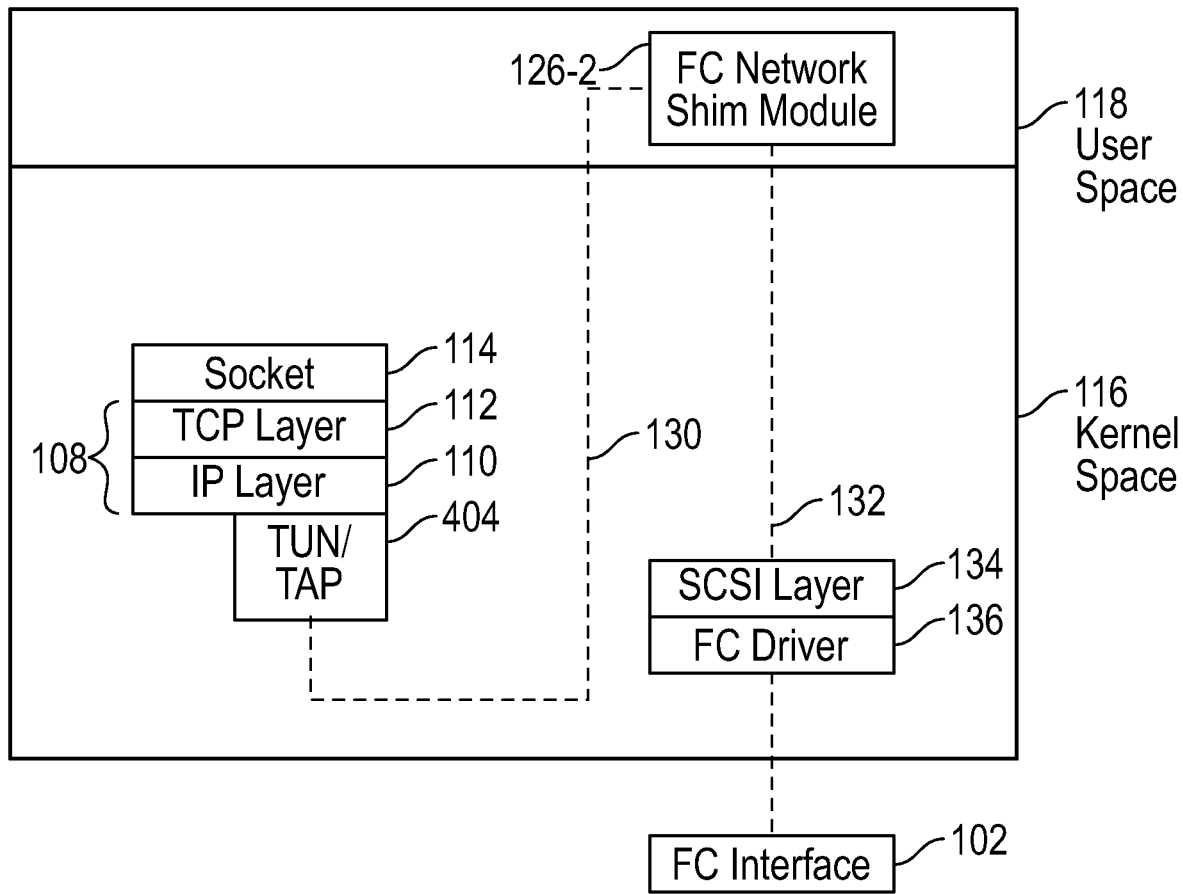

FIG. 4B shows a further example in which the FC network shim code 126 of FIG. 1 is implemented as the FC network shim module 126-2 in the user space 118, similar to the arrangement of FIG. 4A. However, in FIG. 4B, the SCSI layer 134 and the FC driver 136 are part of the kernel space 116.

Figure 5:
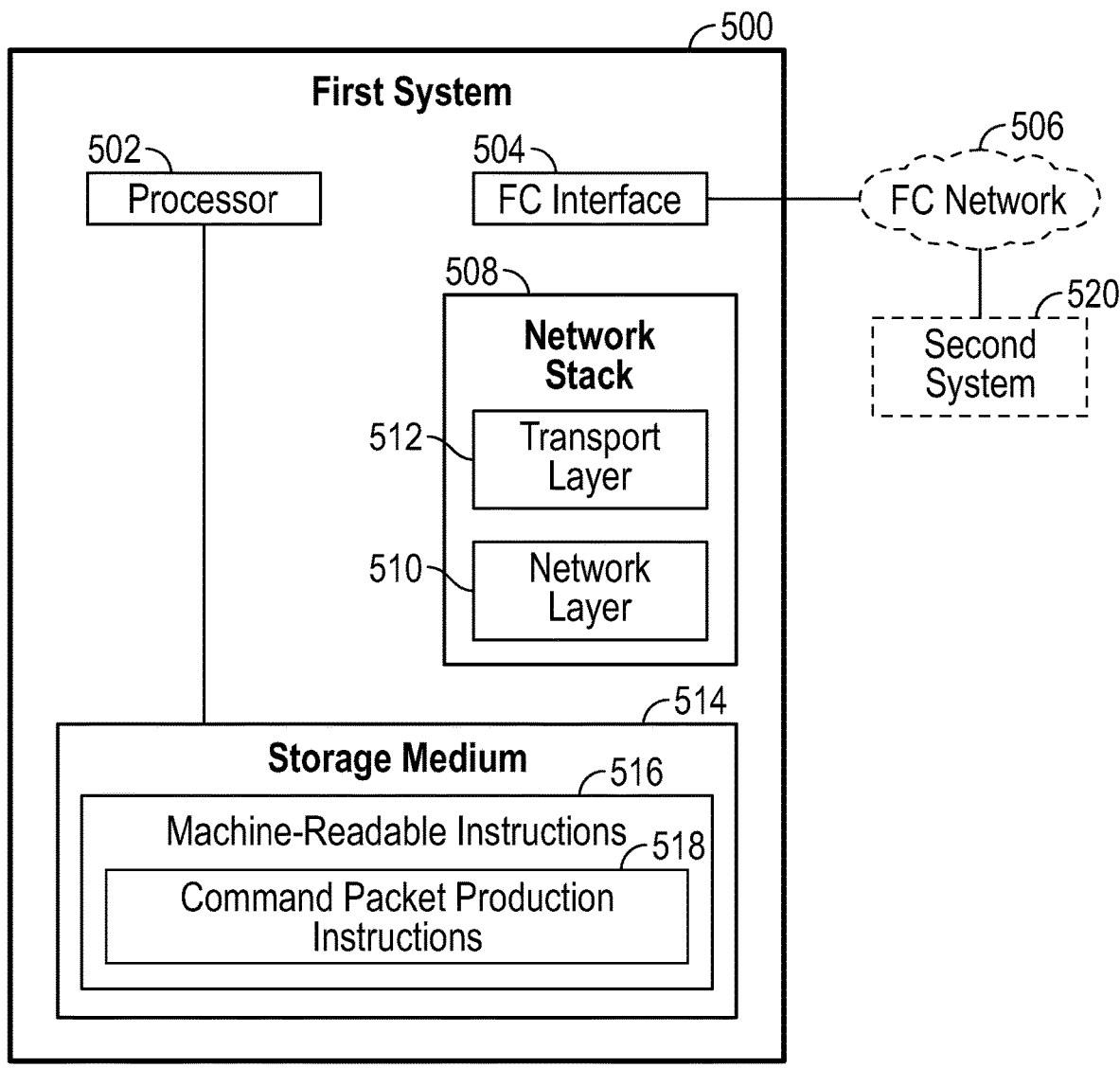
FIG. 5 is a block diagram of a system according to some examples.

FIG. 5 is a block diagram of a first system 500 according to some examples. The first system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The first system 500 includes an FC interface 504 to communicate over an FC network 506.

The first system 500 includes a network stack 508 that has a network layer 510 (e.g., an IP layer) and a transport layer 512 (e.g., a TCP layer).

The first system 500 includes a non-transitory machine-readable or computer-readable storage medium 514 storing machine-readable instructions 516 (e.g., the FC network shim code 126 of FIG. 1) executable on the hardware processor 502 to perform various tasks. Machine-readable instructions executable on a hardware processor can refer to the instructions executable on a single hardware processor or the instructions executable on multiple hardware processors.

The machine-readable instructions 516 include command packet production instructions 518 to produce a command packet including a payload containing data for transmission to a second system 520, where the payload further contains headers for the network layer 510 and the transport layer 512, and the command packet is according to a storage interface protocol (e.g., a SCSI protocol).

The FC interface 504 is to communicate the command packet over the FC network 506.

In some examples, the machine-readable instructions 516 are in a kernel space in the first system 500. In other examples, the machine-readable instructions 516 are in a user space in the first system 500. In the latter examples where the machine-readable instructions 516 are in the user space, the first system 500 also includes a kernel virtual network device (e.g., the TUN/TAP device discussed above) that the machine-readable instructions 516 can interact with to communicate between the network stack 508 and the FC interface 504.

In some examples, the payload of the command packet produced by the command packet production instructions 518 further includes a data link layer header (e.g., an Ethernet header) that is used as part of the virtual Ethernet abstraction provided by the machine-readable instructions 516. The virtual Ethernet abstraction involves presenting an FC-based connection as a virtual Ethernet link to the network stack 508.

Figure 6:
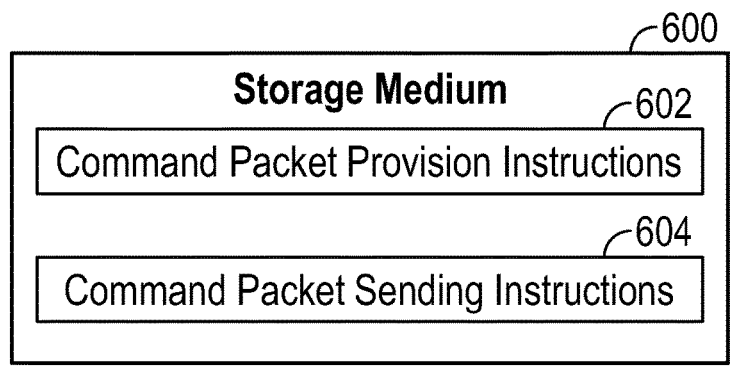
FIG. 6 is a block diagram of a storage medium storing machine-readable instructions according to some examples.

FIG. 6 is a block diagram of a non-transitory machine-readable or computer-readable storage medium 600 storing machine-readable instructions executable by a system (e.g., 100 in FIG. 1 or 500 in FIG. 5) to perform various tasks.

The machine-readable instructions include command packet provision instructions 602 to include, in a command packet according to a storage interface protocol (e.g., a SCSI protocol), a payload including a transport layer header, a network layer header, and outgoing data received from a network stack having a transport layer and a network layer.

The machine-readable instructions include command packet sending instructions 604 to send the command packet through an FC interface to an FC network.

Figure 7:
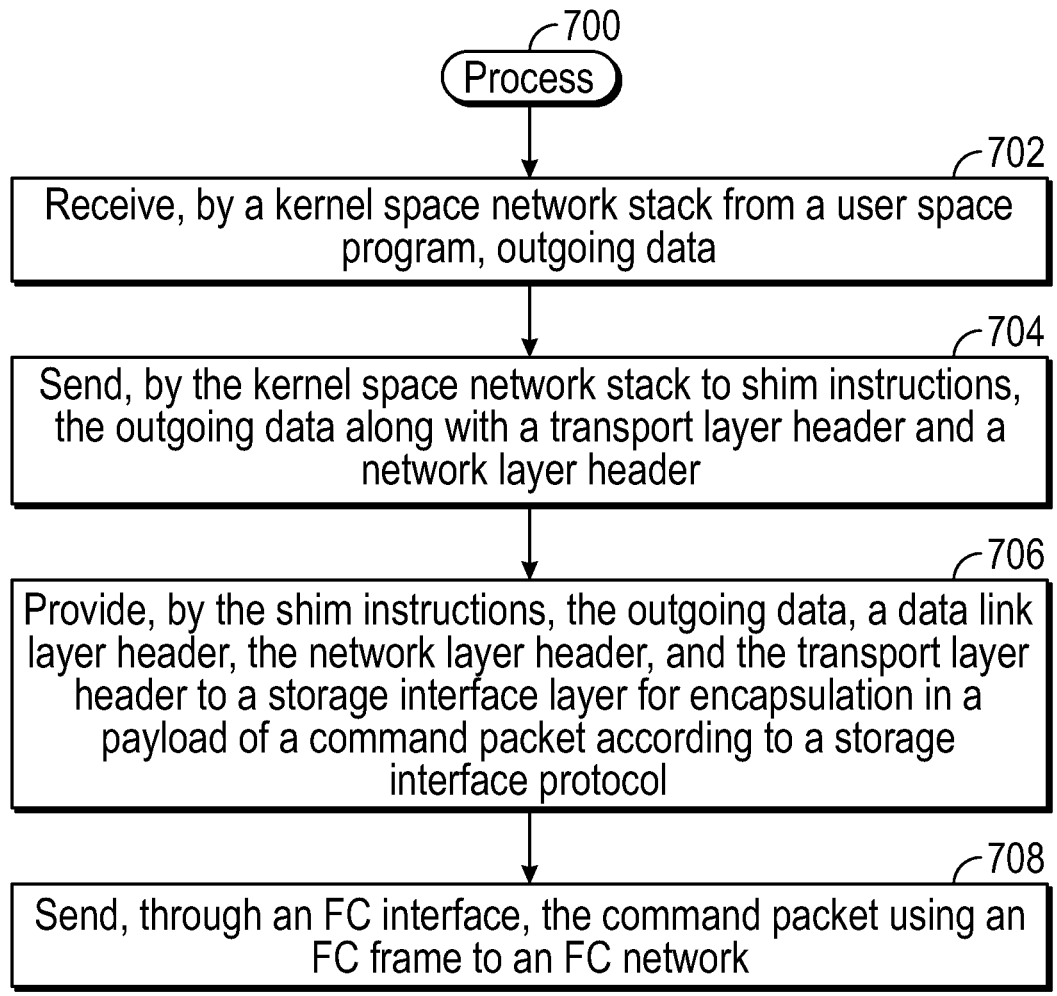
FIG. 7 is a flow diagram of a process according to some examples.

FIG. 7 is a flow diagram of a process 700 according to some examples, which can be performed by a system (e.g., 100 in FIG. 1 or 500 in FIG. 5).

The process 700 includes receiving (at 702), by a kernel space network stack (e.g., 108 in FIG. 1 or 508 in FIG. 1) from a user space program (e.g., 119 in FIG. 1), outgoing data.

The process 700 includes sending (at 704), by the kernel space network stack to shim instructions (e.g., 126-1 or 126-2 in FIG. 1, FIG. 3, or FIG. 4), the outgoing data along with a transport layer header and a network layer header.

The process 700 includes providing (at 706), by the shim instructions, the outgoing data, a data link layer header, the network layer header, and the transport layer header to a storage interface layer (e.g., the SCSI layer 134 of FIG. 1, 3, or 4) that encapsulates the outgoing data, the data link layer header, the network layer header, and the transport layer header in a payload of a command packet according to a storage interface protocol (e.g., a SCSI protocol).

The process 700 includes sending (at 708), through an FC interface, the command packet using a FC frame to an FC network.

In further examples, the process 700 can further include receiving, by the FC interface, an incoming FC frame, and extracting, based on the incoming FC frame, a received command packet including a payload that includes incoming data, an incoming data link layer header, a network layer header, and a transport layer header. The incoming data, the network layer header, and the transport layer header are provided to the network stack, and the network stack provides the incoming data to the user space program.

A storage medium (e.g., 514 in FIG. 5 or 600 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first system comprising:
    a processor;
    a Fibre Channel (FC) interface to communicate over an FC network; and
    a non-transitory storage medium storing machine-readable instructions executable on the processor to implement:
        a network stack in kernel space of an operating system (OS); and
        an FC network shim module in user space of the OS;
        a storage interface protocol layer in the user space; and
        an FC driver in the user space;
        the network stack to:
            receive outgoing data from a program in user space of the OS; and
            send the outgoing data to the FC network shim module;
        the FC network shim module to provide the outgoing data to the storage interface protocol layer;
        the storage interface protocol layer to provide the outgoing data to the FC driver; and the FC driver to send the outgoing data, via the FC interface, to the FC network.

2. The system of claim 1, wherein the machine-readable instructions are executable on the processor to:
with the FC driver, receive one or more incoming FC frames from the FC interface;
with the FC driver and the storage interface protocol layer in the user space of the OS, extract incoming data based on the one or more incoming FC frames;
with the FC network shim module in the user space of the OS, provide the incoming data from the storage interface protocol layer to the network stack in the kernel space; and
with the FC network stack, provide the incoming data to the program in the user space.

3. A method performed by a system comprising a hardware processor, comprising:
receiving, by a network stack executing in kernel space of an operating system (OS), outgoing data from a program executing in user space of the OS;
the network stack, executing in the kernel space of the OS, sending the outgoing data to a Fibre Channel (FC) network shim module implemented in the user space of the OS;
the FC network shim module providing the outgoing data to a storage interface protocol layer in the user space of the OS;
the storage interface protocol layer providing the outgoing data to an FC driver in the user space of the OS; and
the FC driver sending, the outgoing data to an FC network via a hardware FC interface.

4. The method of claim 3, further comprising:
receiving, by the hardware FC interface, one or more incoming FC frames;
providing the one or more incoming FC frames to the FC driver in the user space of the OS;
the FC driver and the storage interface protocol layer in the user space of the OS extracting incoming data based on the one or more incoming FC frames;
the FC network shim module implemented in the user space of the OS providing the incoming data from the storage interface protocol layer to the network stack executing in the kernel space; and
the FC network stack providing the incoming data to the program executing in the user space.

5. The method of claim 4, comprising:
the FC network shim module, implemented in the user space, processing incoming data from the hardware FC interface and providing the processed incoming data to the network stack in the kernel space.

6. The method of claim 3, comprising:
the FC network shim module presenting an FC-based connection as a virtual Ethernet link to the network stack.

7. The method of claim 3, comprising:
the FC network shim module registering a virtual Ethernet device with the network stack, wherein the registering comprises:
providing, to the network stack, an indication to cause the network stack executing in the kernel space to transfer Ethernet data to the FC network shim module in the user space instead of an Ethernet driver in the kernel space.

8. The method of claim 3, comprising:
presenting, to the network stack executing in the kernel space, layers of the system that enable communication over the FC network as layers for Ethernet communications.

9. The method of claim 8, wherein the layers of the system that enable communication over the FC network comprise the storage interface protocol layer in the user space, the FC driver in the user space, and the hardware FC interface.

10. The method of claim 3, comprising:
the FC network shim module, implemented in the user space, redirecting the outgoing data from the network stack in the kernel space to a path that leads to the hardware FC interface.

11. The method of claim 3, wherein the hardware FC interface comprises an FC port through which the outgoing data is transmitted for communication over the FC network, the method comprising:
creating a network layer address based on information associated with the FC port;
creating a data link layer address based on information associated with the FC port; and
the network stack sending, to the FC network shim module, the network layer address and the data link layer address with the outgoing data.

12. The method of claim 11, wherein:
the network layer address is an Internet Protocol (IP) address; and
the data link layer address is a Medium Access Control (MAC) address.

13. The method of claim 12, wherein:
the IP address is an IPv6 address comprising:
a prefix set to a specified value;
an intermediate value set to all binary zeros; and
an interface identifier value set to a value based on information associated with the FC port.

14. A non-transitory machine-readable storage medium comprising instructions executable by a processor of a system to:
implement a network stack in kernel space of an operating system (OS); and
implement an FC network shim module in user space of the OS;
implement a storage interface protocol layer in the user space; and
implement an FC driver in the user space;
the network stack to:
receive outgoing data from a program in user space of the OS; and
send the outgoing data to the FC network shim module;
the FC network shim module to provide the outgoing data to the storage interface protocol layer;
the storage interface protocol layer to provide the outgoing data to the FC driver; and
the FC driver to send the outgoing data, via a hardware FC interface, to an FC network.

15. The non-transitory machine-readable storage medium of claim 14, the instructions executable to:
with the FC driver, receive one or more incoming FC frames from the FC interface;
with the FC driver and the storage interface protocol layer in the user space of the OS, extract incoming data based on the one or more incoming FC frames;
with the FC network shim module in the user space of the OS, provide the incoming data from the storage interface protocol layer to the network stack in the kernel space; and with the FC network stack, provide the incoming data to the program in the user space.

16. The non-transitory machine-readable storage medium of claim 14, the instructions executable to:
    create an Internet Protocol (IP) address based on information associated with an FC port, of the hardware FC interface, and through which the outgoing data is transmitted for communication over the FC network;
    create a Medium Access Control (MAC) address based on information associated with the FC port; and
    with the network stack, send, to the FC network shim module, the IP address and the MAC address with the outgoing data.

17. The non-transitory machine-readable storage medium of claim 14, the instructions executable to:
    present, to the network stack in the kernel space, layers of the system that enable communication over the FC network as layers for Ethernet communications, the layers of the system that enable communication over the FC network comprising at least one layer in the user space.

18. The system of claim 1, wherein the instructions are executable to:
    create an Internet Protocol (IP) address based on information associated with an FC port, of the hardware FC interface, and through which the outgoing data is transmitted for communication over the FC network;
    create a Medium Access Control (MAC) address based on information associated with the FC port; and
    with the network stack, send, to the FC network shim module, the IP address and the MAC address with the outgoing data.

19. The system of claim 1, wherein the instructions are executable to:
    present, with the FC network shim module, an FC-based connection as a virtual Ethernet link to the network stack.

20. The system of claim 1, wherein the instructions are executable to:
    present, to the network stack in the kernel space, layers of the system that enable communication over the FC network as layers for Ethernet communications, the layers of the system that enable communication over the FC network comprising at least one layer in the user space.

\* \* \* \* \*